(12) United States Patent
Tatum, III et al.

(10) Patent No.: US 8,938,965 B1
(45) Date of Patent: Jan. 27, 2015

(54) THERMAL POWERED RECIPROCATING-FORCE MOTOR

(75) Inventors: Paul F. Tatum, III, Huntsville, AL (US); Amelia McDow Elliott, Cleveland, TN (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 346 days.

(21) Appl. No.: 13/118,086

(22) Filed: May 27, 2011

(51) Int. Cl.
*B60K 16/00* (2006.01)
*B60L 8/00* (2006.01)
*F03G 6/00* (2006.01)
*F03G 7/00* (2006.01)
*F01B 29/10* (2006.01)
*F02G 1/04* (2006.01)

(52) U.S. Cl.
USPC ....... 60/641.8; 60/641.13; 60/527; 60/641.15

(58) Field of Classification Search
USPC ........... 60/527, 641.13, 529, 325, 531, 641.8; 137/79
See application file for complete search history.

(56) References Cited

U.S. PATENT DOCUMENTS

| | | | |
|---|---|---|---|
| 3,830,060 A | 8/1974 | Jedlicka et al. | |
| 3,913,326 A | 10/1975 | Banks | |
| 4,010,612 A | 3/1977 | Sandoval | |
| 4,257,231 A | 3/1981 | Banks | |
| 4,302,938 A | 12/1981 | Li | |
| 4,302,939 A | 12/1981 | Golestaneh | |
| 4,305,250 A | 12/1981 | Cory | |
| 4,397,151 A | 8/1983 | Houlton | |
| 4,450,686 A | 5/1984 | Banks | |
| 4,517,543 A * | 5/1985 | Brubaker | 337/140 |
| 4,598,550 A * | 7/1986 | Abbott | 60/641.8 |
| 4,691,517 A | 9/1987 | Banks | |
| 4,691,518 A | 9/1987 | Banks | |
| 4,800,722 A | 1/1989 | Arvola et al. | |
| 4,887,430 A * | 12/1989 | Kroll et al. | 60/527 |
| 4,938,026 A | 7/1990 | Goldstein | |
| 4,996,842 A | 3/1991 | Goldstein | |
| 6,127,620 A * | 10/2000 | Tange et al. | 136/246 |
| 6,129,181 A * | 10/2000 | Weems | 185/37 |

(Continued)

FOREIGN PATENT DOCUMENTS

| | | | | |
|---|---|---|---|---|
| DE | 3542225 A1 * | 7/1986 | | F03G 7/06 |
| EP | 0 286 780 A1 | 1/1988 | | |

(Continued)

*Primary Examiner* — Kenneth Bomberg
*Assistant Examiner* — Daniel Wagnitz
(74) *Attorney, Agent, or Firm* — Peter J. Van Bergen; James J. McGroary

(57) ABSTRACT

A thermal-powered reciprocating-force motor includes a shutter switchable between a first position that passes solar energy and a second position that blocks solar energy. A shape memory alloy (SMA) actuator is coupled to the shutter to control switching thereof between the shutter's first and second position. The actuator is positioned with respect to the shutter such that (i) solar energy impinges on the SMA when the shutter is in its first position so that the SMA experiences contraction in length until the shutter is switched to its second position, and (ii) solar energy is impeded from impingement on the SMA when the shutter is in its second position so that the SMA experiences extension in length. Elastic members coupled to the actuator apply a force to the SMA that aids in its extension in length until the shutter is switched to its first position.

8 Claims, 3 Drawing Sheets

(56) References Cited

U.S. PATENT DOCUMENTS

| | | | |
|---|---|---|---|
| 6,647,725 B1 * | 11/2003 | Letovsky | 60/641.6 |
| 6,786,045 B2 * | 9/2004 | Letovsky | 60/641.8 |
| 6,880,336 B2 | 4/2005 | Howard | |
| 7,444,812 B2 | 11/2008 | Kirkpatirck et al. | |
| 8,443,604 B2 * | 5/2013 | Yung | 60/641.8 |
| 8,490,620 B1 * | 7/2013 | Bae et al. | 136/244 |
| 2006/0144048 A1 | 7/2006 | Schulz | |
| 2009/0185302 A1 * | 7/2009 | Forrester et al. | 359/853 |
| 2009/0241537 A1 * | 10/2009 | Browne et al. | 60/527 |
| 2010/0065232 A1 * | 3/2010 | Browne et al. | 160/405 |
| 2010/0196001 A1 | 8/2010 | Ryynanen et al. | |
| 2011/0179790 A1 * | 7/2011 | Pretorius | 60/527 |

FOREIGN PATENT DOCUMENTS

| | | | | |
|---|---|---|---|---|
| EP | 1914421 A1 * | 4/2008 | | F24J 2/38 |
| JP | 59131130 A * | 7/1984 | | G01K 11/00 |
| JP | 2005150569 A * | 6/2005 | | H01L 31/042 |
| WO | WO 86/04960 A1 | 8/1986 | | |

* cited by examiner

THERMAL POWERED RECIPROCATING-FORCE MOTOR

ORIGIN OF THE INVENTION

The invention was made by an employee of the United States Government and may be manufactured and used by or for the Government for governmental purposes without the payment of any royalties.

BACKGROUND OF THE INVENTION

1. Field of the Invention

This invention relates to non-electric powered motors. More specifically, the invention is thermal-powered, reciprocating-force motor using a shape memory alloy actuator.

2. Description of the Related Art

Dirty environments have always presented challenges for designers of moving-part mechanisms that must operate in such environments. The lunar environment with its abrasive dust presents a particularly challenging environment for moving-part mechanisms. For example, typical motors are electrically-powered devices that transfer energy through bearings, shafts, and gears. Unfortunately, even with the best of seals and covers, lunar dust can quickly infiltrate a motor's various moving/bearing surfaces thereby causing a motor to fail. Furthermore, since electrical power is generally at a premium in a lunar environment, electric motors must have an adequate power supply which increases the cost, size and weight of the system utilizing the motor.

SUMMARY OF THE INVENTION

Accordingly, it is an object of the present invention to provide a motor design that can withstand the rigors of a dirty environment.

Another object of the present invention is to provide a non-electric motor design.

Other objects and advantages of the present invention will become more obvious hereinafter in the specification and drawings.

In accordance with the present invention, a thermal-powered reciprocating-force motor includes a shutter switchable between a first position that allows passage of solar energy and a second position that blocks passage of solar energy. An actuator, to include a shape memory alloy (SMA) that changes in length as a function of temperature, is coupled to the shutter for controlling switching thereof between the shutter's first and second position based on length of the SMA. The actuator is positioned with respect to the shutter such that (i) solar energy impinges on the SMA when the shutter is in its first position so that the SMA experiences contraction in length until the shutter is switched to its second position, and (ii) solar energy is impeded from impingement on the SMA when the shutter is in its second position so that the SMA experiences extension in length. One or more restoring force devices/mechanisms are coupled to at least one of the actuator and shutter for applying a force to the SMA that aids in its extension in length until the shutter is switched to its first position.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

The motor of the present invention uses thermal energy available in an environment (e.g., solar energy) to help generate a reciprocating motion/force that can be used as a motive force for a variety of applications. The present invention will be particularly useful in space applications where the presence of solar energy provides the energy for one half of a reciprocating motion cycle, while the extremely cold temperatures resulting during the absence of solar energy provides the energy for the other half of a reciprocating motion cycle. However, it is to be understood that the present invention is not limited to use in space applications.

The motor of the present invention can be realized by a variety of embodiments. Several non-limiting examples will be described herein to illustrate the motor's novelty. In each example, it will be assumed that the thermal energy accessed by the motor originates from the sun, i.e., solar energy.

Figure 1A:
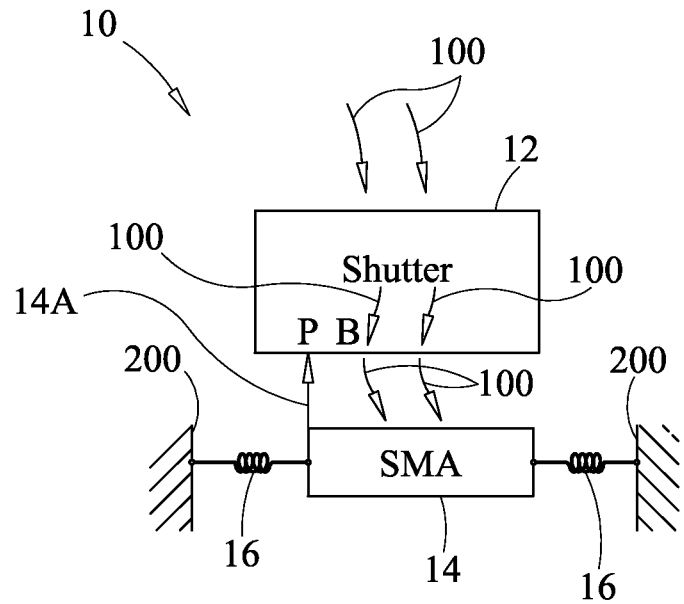
FIG. 1A is a schematic view of a thermal-powered reciprocating-motion motor at the start of its contraction motion in accordance with an embodiment of the present invention.
Figure 1B:
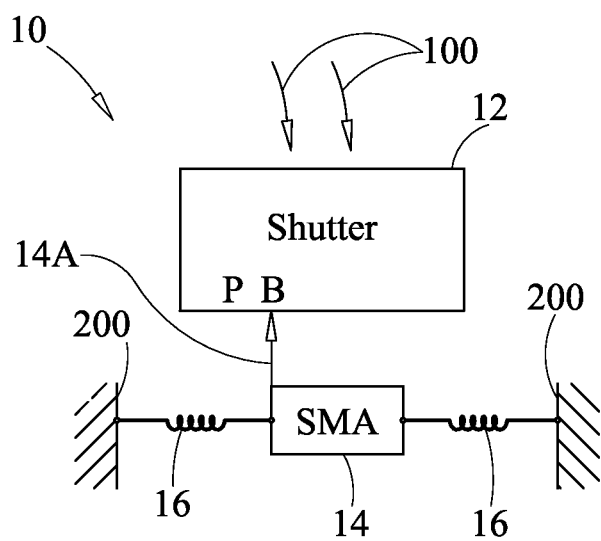
FIG. 1B is a schematic view of the motor in FIG. 1A at the start of its extension motion.

Referring now to the drawings and more particularly to FIGS. 1A and 1B, a first embodiment of a motor in accordance with the present invention is shown and is referenced generally by numeral 10. Motor 10 is shown at the two extremes of its reciprocating motion cycle. During motor operation, motor 10 continuously cycles between these two extremes whereby the resulting reciprocating motion becomes the motor's motive force for an application that is not part of or a limitation of the present invention. The thermal energy utilized by motor 10 is solar energy referenced by wavy arrows 100.

Motor 10 includes a shutter 12, an actuator 14 that includes (in-part or wholly) a shape memory alloy (SMA) and one or more elastic force-providing devices/members 16. Shutter 12 must define two operating positions. The first position must provide for the passage of solar energy 100 (FIG. 1A) while the second position must block passage of solar energy 100 (FIG. 1B). It is to be understood that a variety of mechanisms can be used to perform the passage/blockage function of shuttle 12. For example, in harsh lunar environments shutter 12 could be a simple one-piece shade pulled, pushed, rotated, etc., between the two extreme positions thereof.

Actuator 14 includes (or is) an SMA that is known to change dimensionally as a function of temperature. In general, the SMA experiences linearly opposing dimensional changes at known hot/cold temperatures. More specifically, the SMA is configured to experience a linear contraction in a length dimension thereof when heated, and then an opposing linear extension in the length dimension when the SMA is subsequently cooled. The particular choice of SMA is not a limitation of the present invention. However, some of the most common and readily-available SMAs include nickel-titanium alloys (e.g., Nitinol), copper-aluminum-nickel alloys, copper-zinc-aluminum alloys, and iron-manganese-silicon alloys.

Actuator 14 is positioned relative to shutter 12 such that solar energy 100 impinges on the SMA when the shutter 12 is passing solar energy 100 (FIG. 1A), and such that solar energy 100 is prevented from impinging on the SMA when shutter 12 is blocking solar energy 100 (FIG. 1B). In the present invention, the contraction and extension of the SMA of actuator 14 is used to switch the position of shutter 12 between its passage/blockage functions. Accordingly, actuator 14 is coupled to shutter 12 in a way that switches the function (i.e., position) of shutter 12 from passage-to-blockage or blockage-to-passage. Such coupling is indicated in FIGS. 1A and 1B by arrow 14A (e.g., a non-SMA control arm) that "toggles" shutter 12 between its solar energy passage mode ("P") and solar energy blocking mode ("B") based on the length of the SMA.

In operation, the SMA of actuator 14 is illustrated in FIG. 1A at the beginning of its contraction motion when solar energy 100 impinges on the SMA of actuator 14 as governed by the "P" position of shutter 12. As the SMA heats, it contracts in length until shutter 12 is placed in its "B" position (FIG. 1B) where solar energy 100 is no longer able to impinge on the SMA of actuator 14. At this point, the SMA begins to cool whereby it begins to experience extension in its length. The cooling and lengthening of the SMA continues until shutter 12 is switched back to its "P" position (FIG. 1A) so that the SMA can again be heated/constructed. This cycle of heating and cooling is continually repeated such that actuator 14 undergoes reciprocating motion that can be utilized by a device/application (not shown) of choice.

Note that in a space environment, the cooling of the SMA is fairly rapid once solar energy 100 is no longer incident on the SMA. One or more elastic force-producing devices/members 16 can be coupled to actuator 14 and fixed supports 200 to aid or enhance the cooling/lengthening of the SMA. Since the SMA will already be lengthening on its own, the restoring force supplied by member(s) 16 can be fairly small such that this restoring force can be easily overcome by the force of contraction when the SMA is heated. Member(s) 16 can be simple springs, elastic material, etc., without departing from the scope of the present invention. The presence of member(s) 16 hastens the toggle action provided by the contracting/lengthening SMA.

Figure 2A:
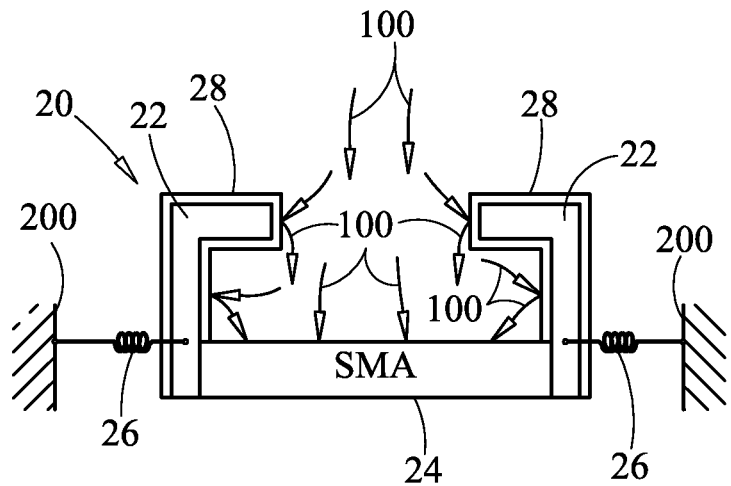
FIG. 2A is a schematic view of a thermal-powered reciprocating-motion motor at the start of its contraction motion in accordance with another embodiment of the present invention.
Figure 2B:
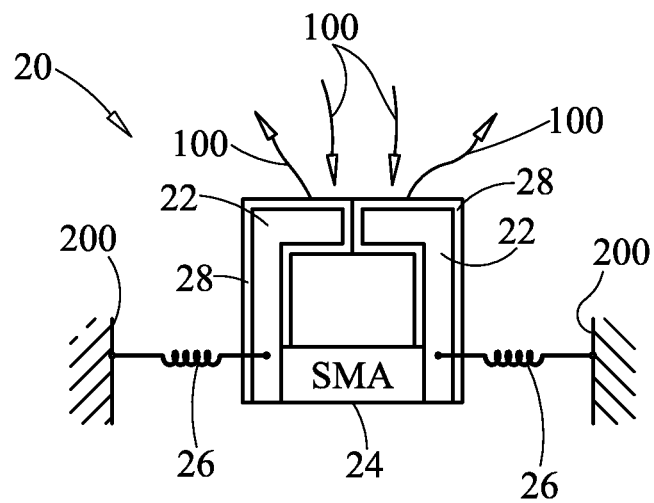
FIG. 2B is a schematic view of the motor in FIG. 2A at the start of its extension motion.

Another embodiment of a motor in accordance with the present invention is illustrated in FIGS. 2A and 2B and is referenced generally by numeral 20. Motor 20 employs a different structure than motor 10, but applies the same principles described above. Motor 20 includes a shutter 22, an actuator 24 that can be made solely of an SMA, and elastic force-producing devices/members 26 coupled to shutter 22 and fixed supports 200. In this embodiment, shutter 22 essentially defines a housing that is open to solar energy 100 when SMA actuator 24 is at the beginning of its contraction motion (FIG. 2A), and closed to solar energy 100 when SMA actuator 24 is at the beginning of its extension motion (FIG. 2B). To enhance heating and cooling of SMA actuator 24, shutter 22 can be coated on all sides there of with reflective material 28. Thus, when shutter 22 is open (FIG. 2A), solar energy 100 can be directly incident on SMA actuator 24 as well as reflect off portions of material 28 facing SMA actuator 24 to be incident on SMA actuator 24. When shutter 22 is closed (FIG. 2B), the portions of material 28 exposed to solar energy 100 will reflect it away from motor 20 and SMA actuator 24 to hasten the cooling of actuator 24. Operation of motor 20 is similar to that of motor 10 with members 26 operating in an analogous fashion to members 16 described above.

Figure 3A:
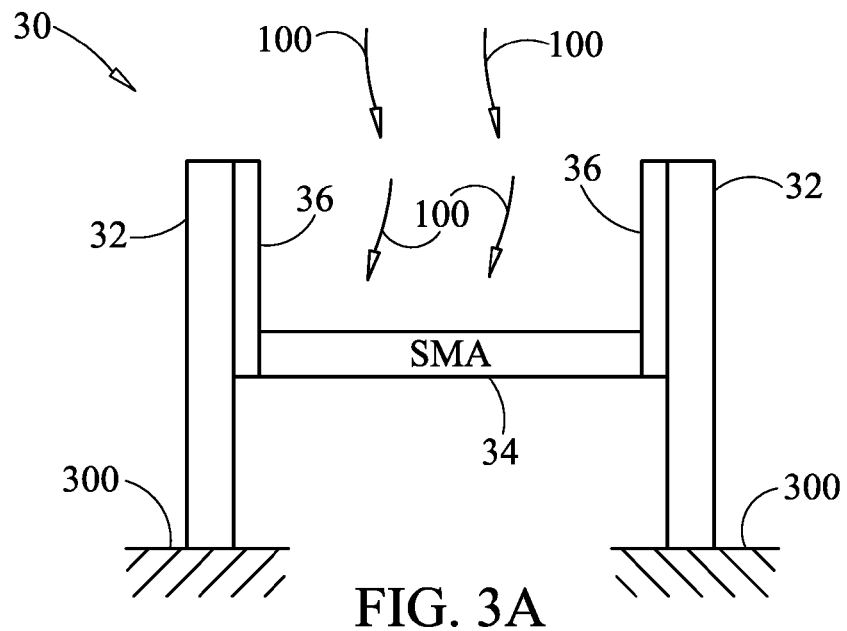
FIG. 3A is a schematic view of a thermal-power reciprocating-motion motor at the start of its contraction motion in accordance with another embodiment of the present invention.
Figure 3B:
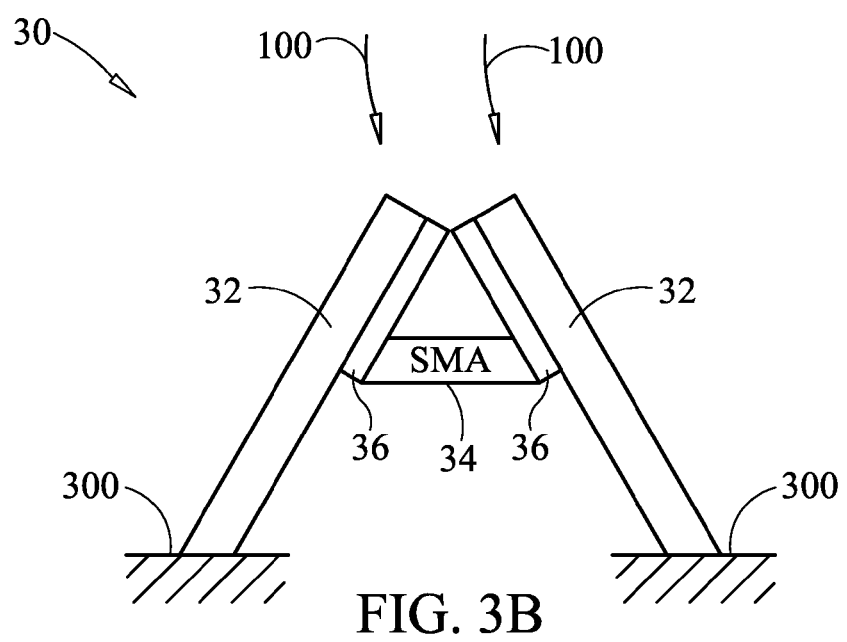
FIG. 3B is a schematic view of the motor in FIG. 3A at the start of its extension motion.

Still another embodiment of the present invention is illustrated in FIGS. 3A and 3B and is referenced generally by numeral 30. Once again, motor 30 employs a different structure as compared to motors 10 and 20, but applies the same principles already described herein. Motor 30 includes a shutter 32 defined by two flexible walls mounted on fixed supports 300, SMA actuator 34 that spans and is coupled to the two walls defining shutter 32, and leaf springs 36 coupled to each wall of shutter 32 at either end of SMA actuator 34. In this embodiment, each wall of shutter 32 is configured to flex as SMA actuator 34 contracts in length. More specifically, the walls defining shutter 32 are positioned in FIG. 3A to allow solar energy 100 to impinge on SMA actuator 34 whereby it heats/contracts. As SMA actuator 34 contracts, the walls of shutter 32 flex until they snap over SMA actuator 34 and thereby block the transmission of solar energy 100 to SMA actuator 34 as illustrated in FIG. 3B. Then, as SMA actuator cools/lengthens, leaf springs 36 act to hasten the lengthening of SMA actuator 34 and also cause shutter 32 to snap open whereby heating/contraction of SMA actuator can begin again. Reflective material (not shown) can also be applied to shutter 32 to enhance the heating/cooling of SMA actuator 34.

The advantages of the present invention are numerous. The reciprocating-motion motor requires no electricity and is readily adapted for harsh and/or dirty environments. The motor can also take advantage of the extreme temperatures encountered in space in order to enhance the motor's efficiency and output. The motor can be realized in a variety of ways and on a variety of size scales thereby further increasing its versatility.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A thermal-powered reciprocating-force motor, comprising:
   a shutter switchable between a first position adapted to allow passage of solar energy and a second position adapted to block passage of solar energy;
   an actuator having opposing ends, said actuator including a shape memory alloy (SMA) that changes in length as a function of temperature, said actuator coupled to said shutter for controlling switching thereof between said first position and said second position based on length of said SMA, said actuator positioned with respect to said shutter such that (i) solar energy is adapted to impinge on said SMA when said shutter is in said first position wherein said SMA experiences contraction in length until said shutter is switched to said second position, and (ii) solar energy is adapted to be impeded from impingement on said SMA when said shutter is in said second position wherein said SMA experiences extension in length;

an elastic member coupled to each of said opposing ends of said actuator for applying a force to said SMA that aids in said extension in length until said shutter is switched to said first position; and reflective material directly in contact with said shutter for reflecting said solar energy towards said actuator when said shutter is in said first position and for reflecting said solar energy away from said actuator when said shutter is in said second position.

2. A motor as in claim 1, wherein said actuator includes a non-SMA portion coupled to said SMA and said shutter, and wherein said non-SMA portion controls switching of said shutter between said first position and said second position when said SMA experiences one of said extension in length and said contraction in length.

3. A motor as in claim 1, wherein said actuator is comprised entirely of said SMA.

4. A motor as in claim 1, wherein said SMA is selected from the group consisting of nickel-titanium alloys, copper-aluminum-nickel alloys, copper-zinc-aluminum alloys, and iron-manganese-silicon alloys.

5. A thermal-powered reciprocating-force motor, comprising:

a shutter switchable between a first position adapted to transmit thermal energy and a second position adapted to block thermal energy;

an actuator having opposing ends, said actuator including a shape memory alloy (SMA) that experiences linear contraction when heated and then linear extension when subsequently cooled, said actuator coupled to said shutter for controlling switching thereof from said first position to said second position during said linear contraction and for switching said shutter from said second position to said first position during said linear extension, said actuator positioned with respect to said shutter such that (i) thermal energy transmitted by said shutter in said first position reaches said SMA, and (ii) thermal energy blocked by said shutter in said second position is prevented from reaching said SMA;

an elastic member coupled to each of said opposing ends of said actuator for applying a force to said SMA that aids said linear extension until said shutter is switched to said first position; and reflective material coating said shutter for movement therewith, said reflective material directing said thermal energy towards said actuator when said shutter is in said first position and directing said thermal energy away from said actuator when said shutter is in said second position.

6. A motor as in claim 5, wherein said actuator includes a non-SMA portion coupled to said SMA and said shutter, and wherein said non-SMA portion controls switching of said shutter between said first position and said second position when said SMA is experiencing one of said linear extension and said linear contraction.

7. A motor as in claim 5, wherein said actuator is comprised entirely of said SMA.

8. A motor as in claim 5, wherein said SMA is selected from the group consisting of nickel-titanium alloys, copper-aluminum-nickel alloys, copper-zinc-aluminum alloys, and iron-manganese-silicon alloys.

* * * * *